United States Patent
Matsushita et al.

(10) Patent No.: US 7,625,143 B2
(45) Date of Patent: Dec. 1, 2009

(54) CAMERA SYSTEM

(75) Inventors: Takeshi Matsushita, Tokyo (JP);
Toshihiro Hamamura, Tokyo (JP);
Masahiro Koinuma, Saitama (JP);
Takashi Enomoto, Chiba (JP);
Masakazu Saori, Saitama (JP)

(73) Assignee: Hoya Corporation, Tokyo (JP)

( * ) Notice: Subject to any disclaimer, the term of this patent is extended or adjusted under 35 U.S.C. 154(b) by 434 days.

(21) Appl. No.: 11/255,947

(22) Filed: Oct. 24, 2005

(65) Prior Publication Data
US 2006/0088314 A1  Apr. 27, 2006

(30) Foreign Application Priority Data
Oct. 25, 2004  (JP)  ............... P2004-309300

(51) Int. Cl.
*G03B 15/03* (2006.01)
(52) U.S. Cl. ...................... 396/529; 396/177
(58) Field of Classification Search .......... 396/177, 396/348, 529, 532, 541; 348/211.14, 262, 348/360, 370, 371, 373–376
See application file for complete search history.

(56) References Cited

U.S. PATENT DOCUMENTS

| | | | | |
|---|---|---|---|---|
| 4,448,509 A | * | 5/1984 | Katsuma et al. | ............ 396/532 |
| 4,466,019 A | * | 8/1984 | Sakashita | .................. 348/375 |
| 6,240,258 B1 | * | 5/2001 | Yoshikawa | ................. 396/311 |
| 6,742,943 B2 | * | 6/2004 | Ushiro | ...................... 396/529 |
| 7,042,499 B1 | * | 5/2006 | Kido et al. | ............. 348/211.14 |
| 7,102,686 B1 | * | 9/2006 | Orimoto et al. | ............ 348/375 |
| 2005/0212921 A1 | * | 9/2005 | Horii | ..................... 348/211.14 |
| 2006/0050170 A1 | * | 3/2006 | Tanaka | ....................... 348/360 |
| 2006/0268159 A1 | * | 11/2006 | Orimoto et al. | ............ 348/373 |

FOREIGN PATENT DOCUMENTS

| | | |
|---|---|---|
| JP | 61-59971 | 3/1986 |
| JP | 8-172561 | 7/1996 |
| JP | 2000-184254 | 6/2000 |

OTHER PUBLICATIONS

U.S. Appl. No. 11/135,275, Enomoto, filed May 24, 2005.
English language Abstract of JP 2000-184254, Jun. 30, 2000.
English language Abstract of JP 8-172561, Jul. 2, 1996.
English language Abstract of JP 61-59971, Mar. 27, 1986.

* cited by examiner

*Primary Examiner*—W B Perkey
(74) *Attorney, Agent, or Firm*—Greenblum & Bernstein P.L.C.

(57) ABSTRACT

A camera system includes a lens unit and a camera body to which the lens unit is detachably attached. The lens unit has a photographing lens, an imaging device which receives light transmitted through the photographing lens, and a lens-side connecting terminal for electric connection. The camera body has a camera-side connecting terminal which is connectable to the lens-side connecting terminal, and a movable member which is movable between a first position that is close to the camera-side connecting terminal and a second position that is far from the camera-side connecting terminal. The camera-side connecting terminal is shut in the camera body when the movable member is in the first position, and the lens unit can be attached when the movable member is in the second position.

14 Claims, 8 Drawing Sheets

CAMERA SYSTEM

BACKGROUND OF THE INVENTION

1. Field of the Invention

The present invention relates to a camera system of a digital camera where the lenses are exchangeable.

2. Description of the Related Art

Recently, the number of digital single-lens reflex cameras has been increasing and their usage is gradually expanding.

In a typical digital single-lens reflex camera, a lens mount is generally arranged around the center of the camera body, and an imaging device is set behind the lens mount. Therefore, due to the restriction on the arrangement of the circuit boards and so on, the equipment tends to be large. And it is difficult to prevent foreign matter including dust, entering into the camera body through the lens mount.

Further, in current digital single-lens reflex cameras, an imaging device is provided only in the camera body, so that suitable imaging devices can not be selected in accordance with the photographing lenses which are available for use.

SUMMARY OF THE INVENTION

Therefore, an object of the present invention is to provide a digital single-lens reflex camera system where the size is small, a suitable imaging device can be selected in accordance with the photographing lens, and the anti-dust property is superior.

A camera system according to the present invention, includes a lens unit and a camera body. The lens unit has a photographing lens, an imaging device which receives light transmitted through the photographing lens, and a lens-side connecting terminal for electric connection. The camera body to which the lens unit is detachably attached, has a camera-side connecting terminal which is connectable to the lens-side connecting terminal, and a movable member which is movable between a first position that is close to the camera-side connecting terminal and a second position that is far from the camera-side connecting terminal. The camera-side connecting terminal is shut in the camera body when the movable member is in the first position, and the lens unit can be attached when the movable member is in the second position.

A camera body according to the present invention, to which a lens unit having a lens-side connecting terminal is detachably attached, includes a camera-side connecting terminal and a movable member. The camera-side connecting terminal is electrically connectable to the lens-side connecting terminal. The movable member is movable between a first position that is close to the camera-side connecting terminal and a second position that is far from the camera-side connecting terminal. The camera-side connecting terminal is shut in the camera body when the movable member is in the first position, and the lens unit can be attached when the movable member is in the second position.

A lens unit according to the present invention, is detachably attached to a camera body having a camera-side connecting terminal, includes a photographing lens, an imaging device, and a lens-side connecting terminal. The imaging device receives light transmitted through the photographing lens, and the lens-side connecting terminal is electrically connectable to the camera-side connecting terminal. In the lens unit, a lens-side non-connected area, that is a part of the surface of the lens-side connecting terminal and is not connectable to the camera-side connecting terminal, is at least partially covered.

BRIEF DESCRIPTION OF THE DRAWINGS

The present invention will be better understood from the description of the preferred embodiment of the invention set forth below together with the accompanying drawings, in which.

DESCRIPTION OF THE PREFERRED EMBODIMENT

Hereinafter, the preferred embodiment of the present invention is described with reference to the attached drawings.

Figure 1:
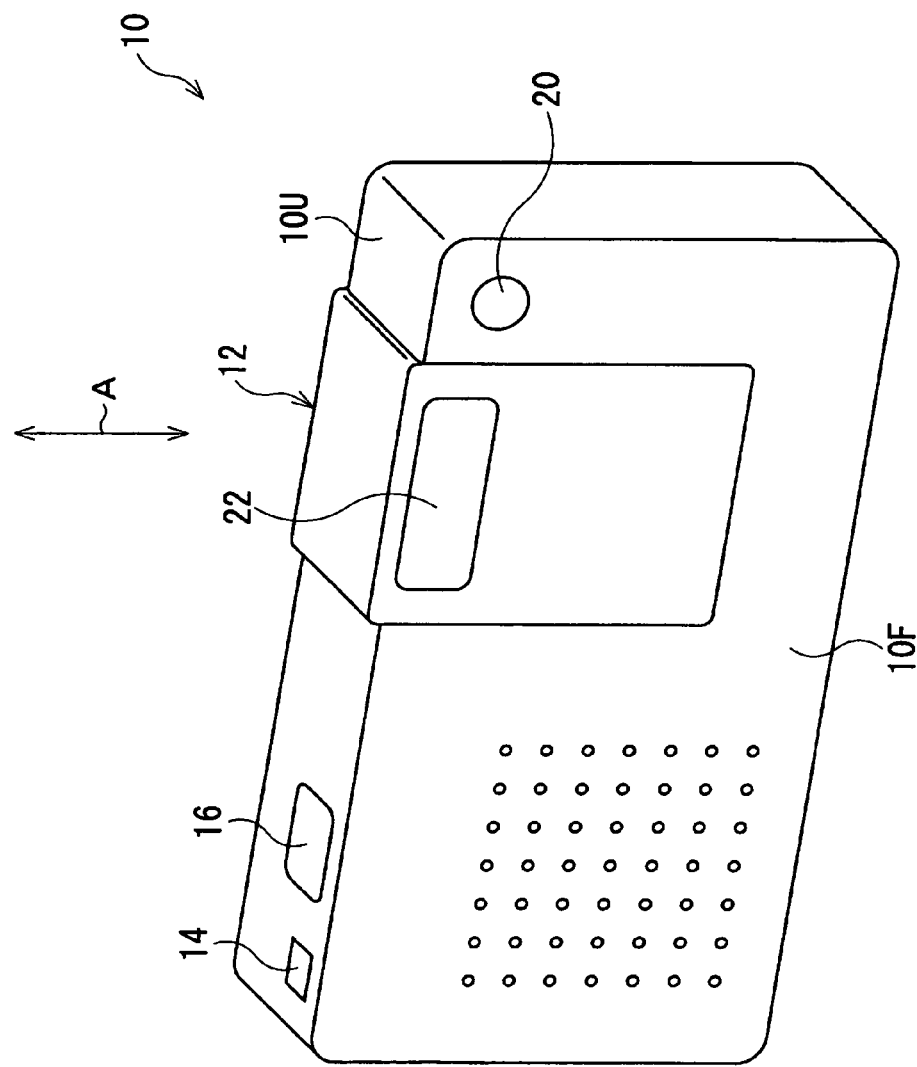
FIG. 1 is a perspective view of a digital camera of the embodiment of the present invention, where a lens unit attaching mouth is closed.
Figure 2:
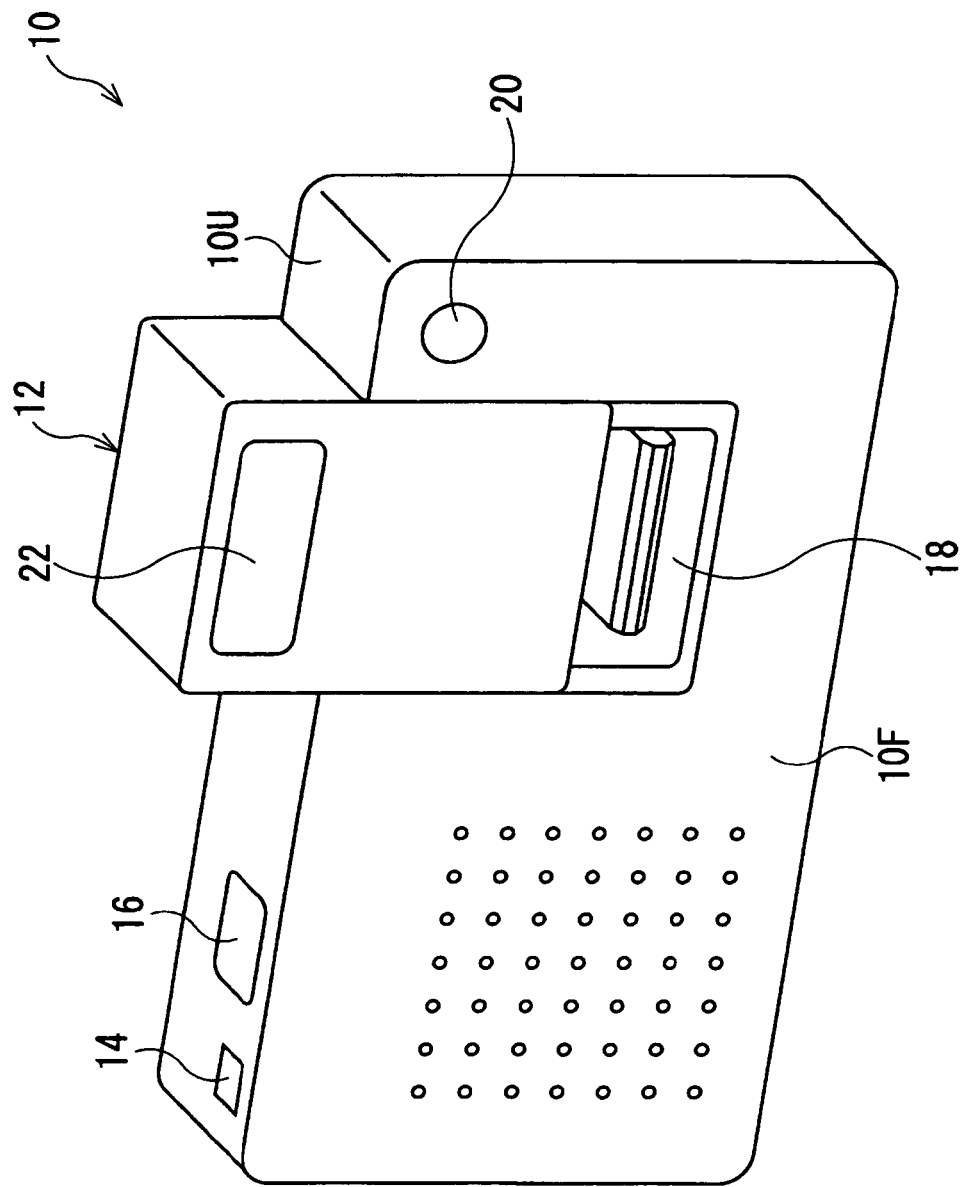
FIG. 2 is a perspective view of the digital camera, where the lens unit attaching mouth is open.
Figure 3:
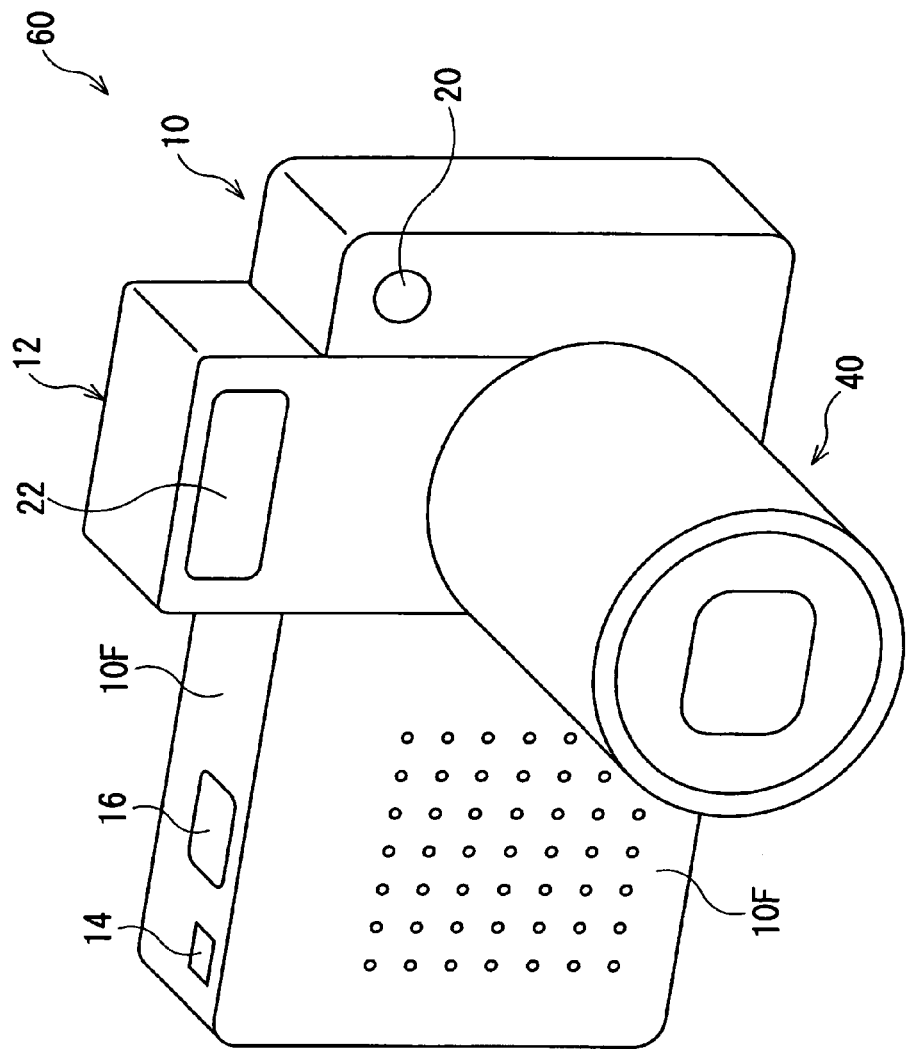
FIG. 3 is a perspective view of the digital camera, where a lens unit is attached to a digital camera body.

FIG. 1 is a perspective view of a digital camera of an embodiment of the present invention, where a lens unit attaching mouth is closed. FIG. 2 is a perspective view of the digital camera, where the lens unit attaching mouth is opened. FIG. 3 is a perspective view of the digital camera, where a lens unit is attached to a digital camera body.

A digital camera body 10 has a power switch button 14 and a release button 16 on its upper surface 10U, and has an LCD (not shown) to display the subject images and so on, on its rear surface. Further, on a front surface 10F of the digital camera body 10, a camera-side lens unit 20 in which a single focus lens is embedded, is provided. Therefore, the digital camera body 10 can photograph subject images using the built in single focus lens.

A sliding member 12 which can slide in the up and down direction, between an upper position and an lower position as indicated by the arrow A, is provided as a part of the surface of the digital camera body 10. A lens unit 40 having photographing lenses and so on (not shown) can be detachably attached to the camera body 10, when the sliding member 12 is in the upper position and a lens unit attaching mouth 18 is open (see FIG. 2 and FIG. 3). A lighting device 22 used for illuminating subjects under low luminance, is provided in the upper side of the sliding member 12.

The lens unit 40 is used for photographing subject images, and the camera-side lens unit 20 is not used in the situation where the lens unit 40 is attached to the camera body 10 to compose a digital camera 60. Note that one of a plurality of different lens units, including the lens unit 40, can be selectively attached to the camera body 10 in accordance with the photographic subject.

A camera-side connecting terminal (not shown) is arranged in the lens unit attaching mouth 18. When the lens unit 40 is attached to the camera body 10, a camera-side connecting terminal of the lens unit 40 is electrically connected to the lens-side connecting terminal (not shown). The lens unit 40 includes a CCD which receives light transmitted through the photographing lenses, a CCD driving circuit, a photographing lens driving mechanism, an aperture mechanism and so on, other than the photographing lens. Thus, the lens unit 40 has all the elements required for photographing subjects, SO that an adjustment for making the optical axes of the lens unit 40 and the camera body 10 coincident, is not required in attachment to the camera body 10, and the attachment does not have to be highly precise. Further, the size of the lens unit 40 can be small and it can have a simplified structure, because the lens unit 40 is attached to the digital camera body 10 via the lens-side connecting terminal, which is provided only for the electrical connection, and arranged on a lens-side protrusion for insertion in the lens unit attaching mouth 18.

As mentioned above, the digital camera body 10 and the lens unit 40 are attached to each other via the camera-side and lens-side connecting terminals only, so that no lens mount is provided in the digital camera body 10. Therefore, the digital camera body 10 can easily be made small because it has no structural restrictions, such as the CCD having to be arranged behind the lens mount. Further, the digital camera body 10 has a superior anti-dust property, because it is fully sealed from the outside by putting the sliding member 12 in the lower position.

Figure 4:
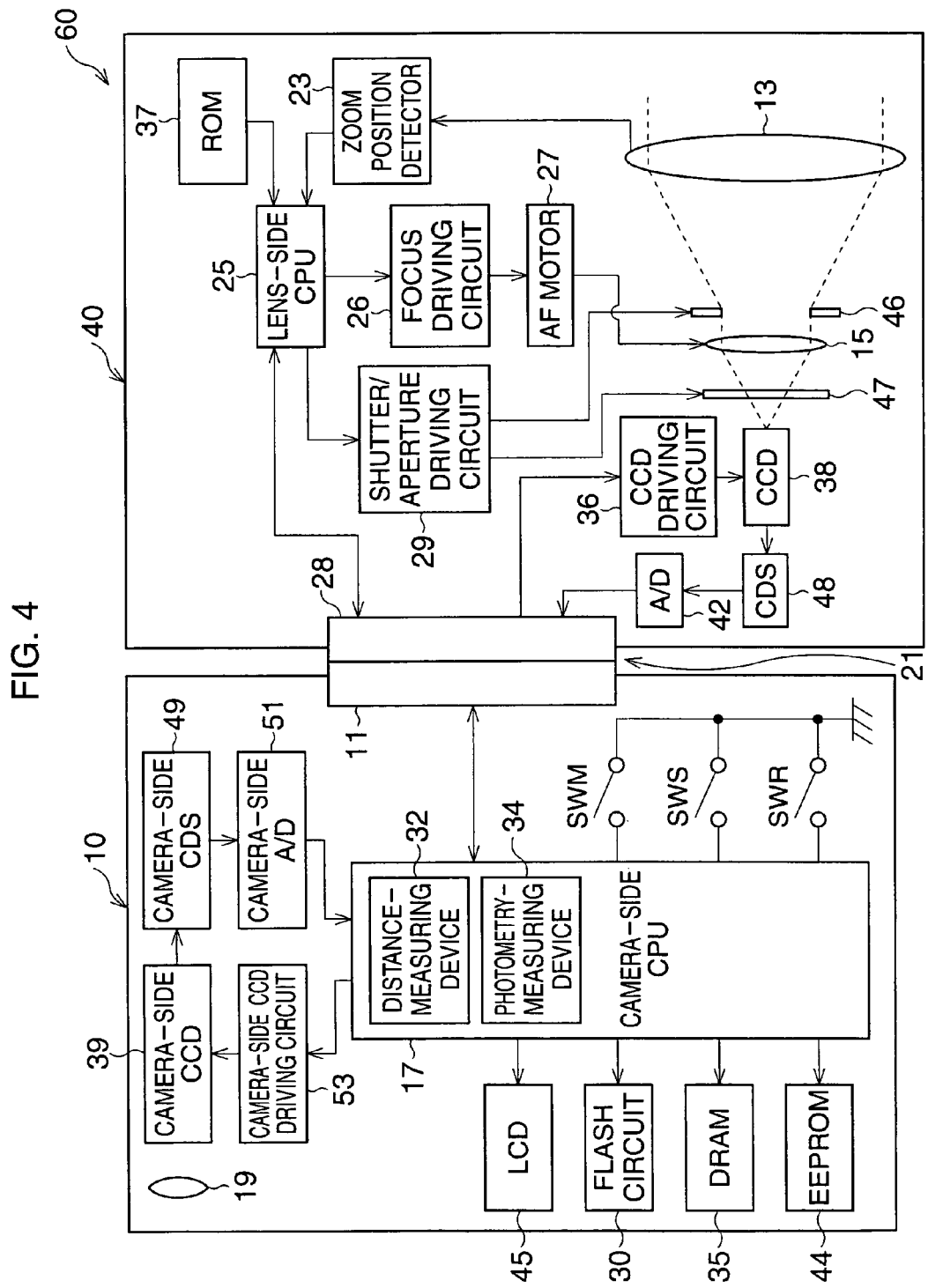
FIG. 4 is a block diagram of the digital camera.

FIG. 4 is a block diagram of the digital camera 60.

The digital camera body 10 has a camera-side CPU 17 which controls the whole digital camera body 10. The lens unit 40 includes a zoom lens having first and second photographing lenses 13 and 15, a ROM 37 which stores lens data, a zoom position detector 23 which detects the zoom position of the first photographing lens 13, and a lens-side CPU 25 which controls the zoom position detector 23 and so forth. When the digital camera body 10 and the lens unit 40 are electrically connected together via an interface 21 comprised of the camera-side connecting terminal 11 and the lens-side connecting terminal 28, the camera-side CPU 17 and the lens-side CPU 25 can communicate with each other. Note that only the first photographing lens 13 and the second photographing lens 15 are shown here, the lens unit 40 also has other lenses.

A main switch SWM is connected to the camera-side CPU 17. When the main switch SWM is turned on by depressing the power switch button 14, the camera-side CPU 17 starts. Data for signal processing in the camera-side CPU 17 is previously stored in an EEPROM 44. A photometry-measuring switch SWS connected to the camera-side CPU 17 turns on when the release button 16 is half depressed. When a photographing mode where the digital camera body 10 photographs the subject images is set, and the photometry-measuring switch SWS turns on, a subject distance is measured by a distance-measuring device 32 and photometry data of a subject to be photographed is measured by a photometry-measuring device 34 respectively. Therefore, distance and photometry data are obtained.

The lens-side CPU 25 controlled by the camera-side CPU 17 based on the distance data, controls a focus driving circuit 26, so that the lens position of the second photographing lens 15 is adjusted for focusing. The focus driving circuit 26 adjusts the position of the second photographing lens 15 by controlling an AF motor 27. And then, the zoom position of the first photographing lens 13 is detected by the zoom position detector 23, and signals for indicating the zoom position are transmitted to the camera-side CPU 17 via the lens-side CPU 25 and the interface 21.

A release switch SWR turns on when the release button 16 is fully depressed. When the release switch SWR turns on, a shutter/aperture driving circuit 29 makes an aperture 46 open by a predetermined amount, and makes a shutter 47 also open by a predetermined amount for a predetermined time, based on the control signal from the camera-side CPU 17. And then, the CCD 38 controlled by the CCD driving circuit 36 based on the control signal from the camera-side CPU 17 is exposed, and the image signals indicating subject image are generated in the CCD 38. At this time, if the camera-side CPU 17 judges that the subject has to be illuminated based on the distance and photometry data, it transmits control signals for illumination to a flash circuit 30, so that the lighting device 22 emits illuminating light.

Image signals generated in the CCD 38 are treated by a CDS circuit 48 to reduce their noise, and are then converted from the analog to the digital by an A/D converter 42. The digitalized image signals are transmitted to the camera-side CPU 17, after various processes such as a white balance adjustment and gamma adjustment. Further, the image signals are transmitted from the camera-side CPU 17 to an LCD driver (not shown), and an LCD 45 is driven based on the image signals, so that the subject image is displayed on the LCD 45. Note that the image data of the photographed subject are stored in a DRAM 35 and a memory card (not shown).

A format size of the CCD 38 is determined in accordance with an angle of view of the zoom lenses including the first and the second photographing lenses 13 and 15. That is, in a plurality of lens units that can be connected to the digital camera body 10, a lens unit having zoom lenses whose angle of view is wider, has a CCD whose format size is larger. Thus, by setting the format sizes of the CCDs to be suitable in accordance with angles of view the zoom lenses, sizes of the zoom lenses suitable for photographing are almost constant, regardless of the type of the lens units.

The camera-side CPU 17 judges whether the lens unit 40 is attached to the camera body 10 or not, based on the result of the communication with the lens unit 40 via the interface 21. As a result of the communication process, when the camera-side CPU 17 judges that the lens unit 40 or any other possible lens units are not attached to the camera body 10, the single focus lens 19 of the camera-side lens unit 20, a camera-side CCD 39 and so on, are used for photographing subject images under the control of the camera-side CPU 17. And obtained image signals are treated similarly to the image signals obtained when the lens unit 40 is attached to the camera body 10 and used. That is, image signals generated by the camera-side CCD 39 under the control of a camera-side CCD driving circuit 53, are treated by a camera-side CDS circuit 49 to reduce their noise, and are then converted from the analog to digital signals by a camera-side A/D converter 51. Further, after various image signal processes are carried out, the subject image based on the processed image signals is displayed on the LCD 45.

Figure 5:
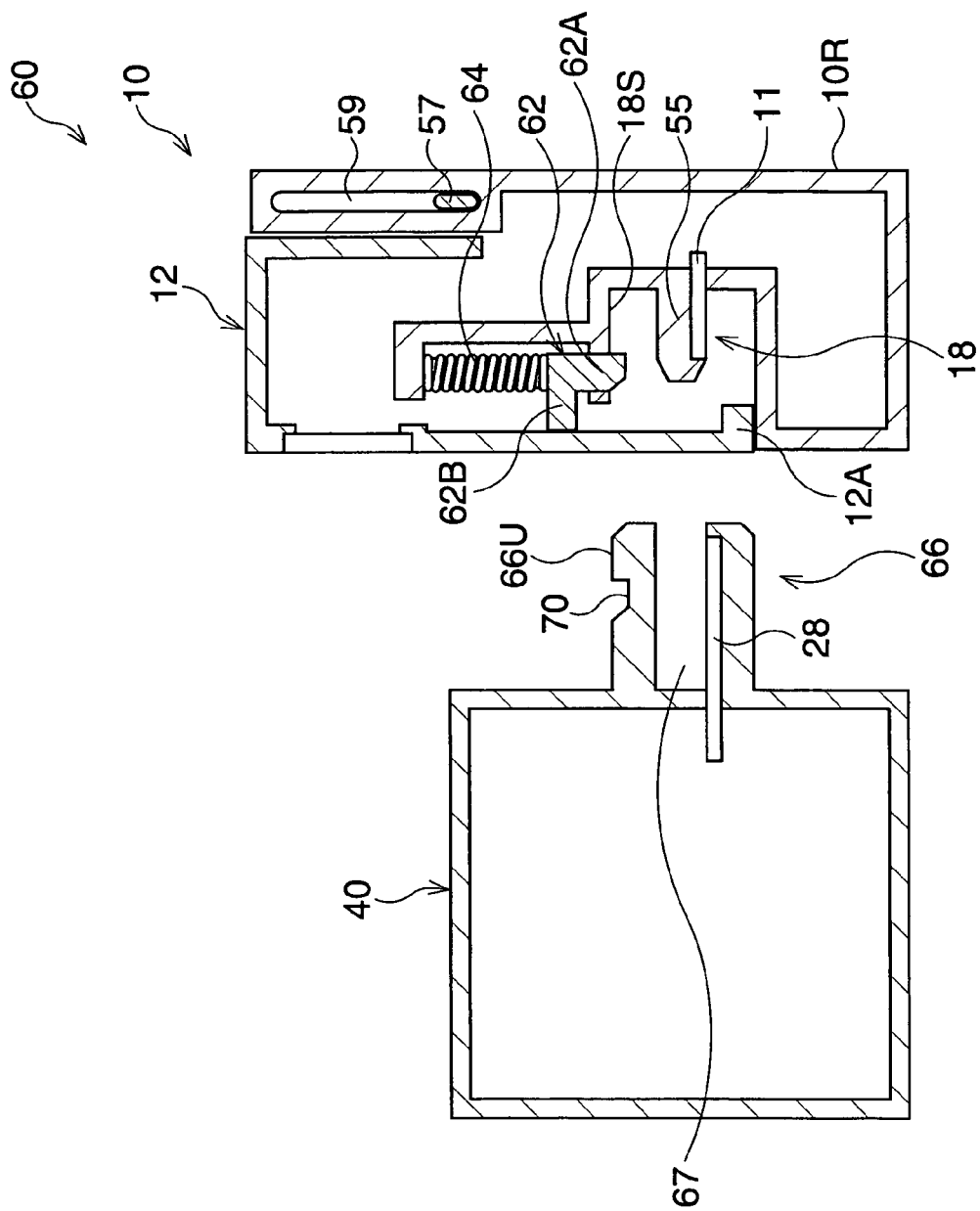
FIG. 5 is a side sectional view of the digital camera, before the lens unit is attached to the digital camera body.
Figure 6:
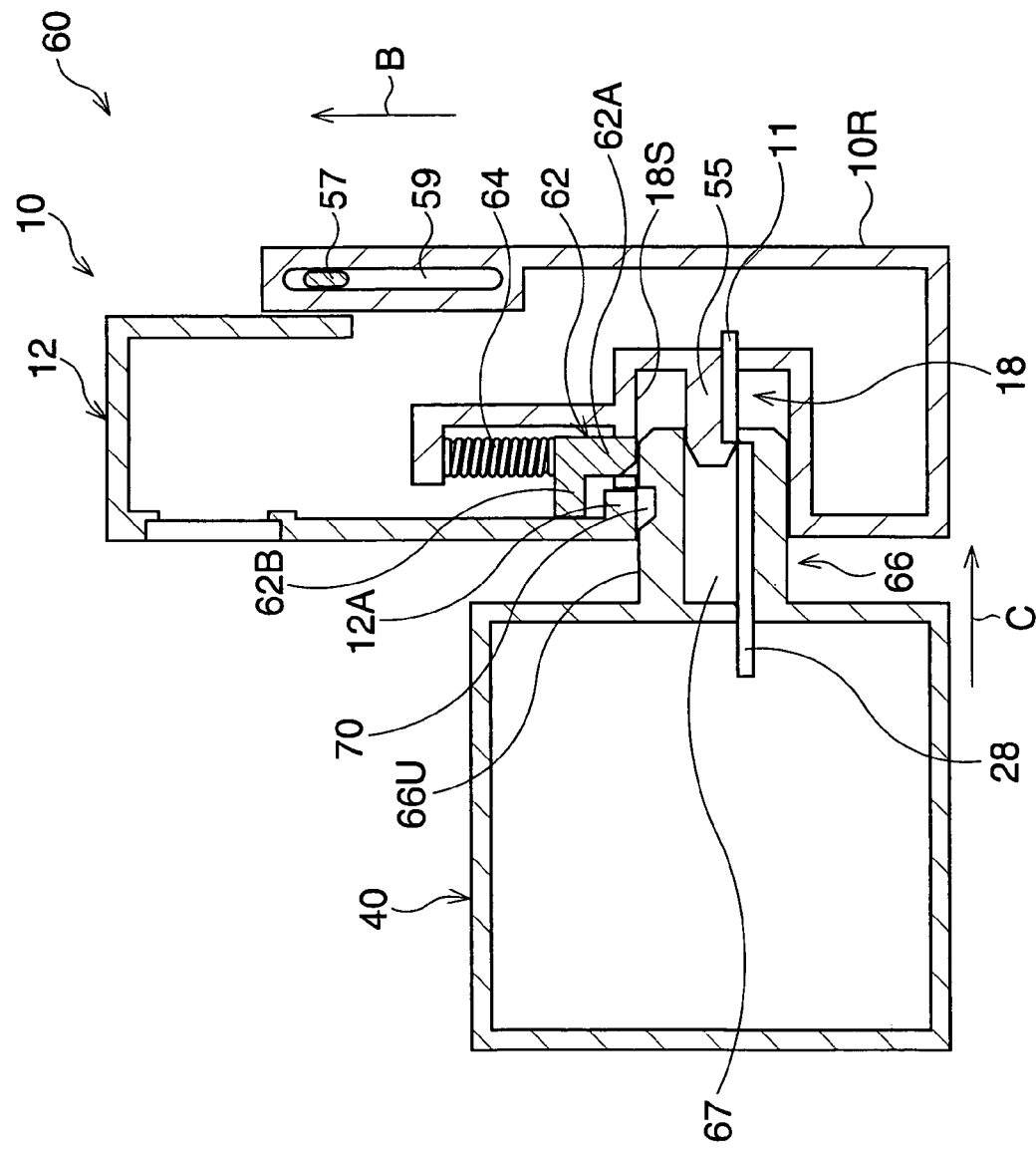
FIG. 6 is a side sectional view of the digital camera, where the lens unit is being attached to the digital camera body.
Figure 7:
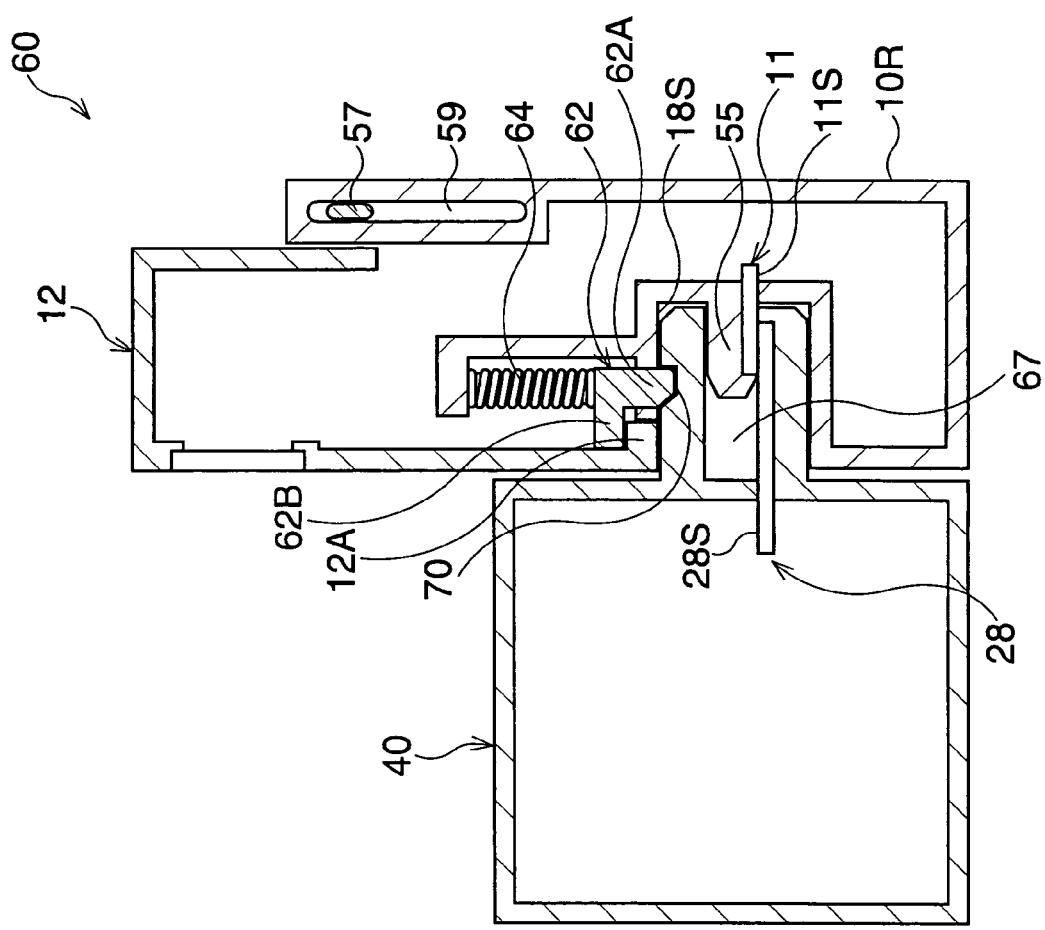
FIG. 7 is a side sectional view of the digital camera, after the lens unit is attached to the digital camera body.

FIG. 5 is a side sectional view of the digital camera 60, before the lens unit 40 is attached to the digital camera body 10. FIG. 6 is a side sectional view of the digital camera 60, where the lens unit 40 is being attaching to the digital camera body 10. FIG. 7 is a side sectional view of the digital camera 60, after the lens unit 40 is attached to the digital camera body 10. Note that in the following figures including FIG. 5 to FIG. 7, each inside structure of the lens unit 40 and digital camera body 10 is omitted.

When the lens unit 40 and any other lens units are not attached to the camera body 10, by putting the sliding member 12 in the lower position, the plate shaped camera-side connecting terminal 11 arranged on a surface of a camera-side protrusion 55, is housed inside the digital camera body 10 and is shut away from the outside of the digital camera body 10 (see FIG. 5). The lower position of the sliding member 12 is a position close to the camera-side connecting terminal 11, and the upper position is a position far from the camera-side connecting terminal 11. The sliding member 12 can slide in the up and down direction because a guide pin 57 fit into a guide slit 59 arranged along the rear surface 10R of the digital camera body 10, is provided.

Inside the digital camera body 10, a pressing member 62 for fixing the lens unit 40 to the digital camera body 10 is provided. The pressing member 62 is attached to a coil spring 64, and the pressing member 62 fixes the attached lens unit 40 to the digital camera body 10, due to the elasticity of the coil spring 64. On the other hand, in the cylindrical lens unit 40, the lens-side protrusion 66 protruding from the surface of the lens unit 40 in the direction of the axis of the cylinder (that is the direction parallel to the optical axis of the photographing lenses), is provided. In the lens-side protrusion 66, a first lens-side recess 67 is provided and the plate shaped lens-side connecting terminal 28 is arranged on an inside wall of the first lens-side recess 67. Further, a second lens-side recess 70 into which the pressing member 62 is fit, is provided on an upper surface 66U of the lens-side protrusion 66.

When the sliding member 12 moves upward as indicated by the arrow B and a part of the lens-side protrusion 66 is inserted into the lens unit attaching mouth 18 of the digital camera body 10, the pressing member 62 pressed by the upper surface 66U of the lens-side protrusion 66, moves upward compressing the coil spring 64 shrunk (see FIG. 6). And when the lens-side protrusion 66 is fully inserted, the camera-side protrusion 55 fits into the first lens-side recess 67, a lens-side connecting surface 28S of the lens-side connecting terminal 28 and a camera-side connecting surface 11S of the camera-side connecting terminal 11 are connected to each other, and the lens unit 40 is attached to the digital camera body 10 (see FIG. 7). At this time, a fitting part 62A of the pressing member 62 having compressed the coil spring 64, fits into the second lens-side recess 70, and fixes the lens unit 40 in place by pressing it due to the extension of the coil spring 64. Here, the pressing member 62 is biased downward due to the elasticity of the coil spring 64, and the fitting part 62A protrudes from an inside wall 18S into the lens unit attaching mouth 18.

When the sliding member 12 is in the lower position and the lens unit attaching mouth 18 is covered by the sliding member 12, the camera-side connecting terminal 11 is shut in the digital camera body 10 and is shut away from the outside thereof, so that all surfaces of the camera-side connecting terminal 11 are covered. Further, even when the sliding member 12 is in the upper position and the lens unit 40 is detached so that the lens unit attaching mouth 18 is open, all surfaces of the camera-side connecting terminal 11 excluding the camera-side connecting surface 11S, are covered. This is because the surfaces of camera-side connecting terminal 11 excluding the camera-side connecting surface 11S, are embedded in the camera-side protrusion 55 or arranged in the digital camera body 10. Thus, in a situation where the lens unit 40 is detached and the lens unit attaching mouth 18 is open, almost all of the camera-side non-connected area, which is part of the surface of the camera-side connecting terminal 11 and which is not connectable to the lens-side connecting terminal 28 is covered, so that the camera-side connecting terminal 11 is well protected from foreign matter, and so on.

As well as the surfaces of the camera-side connecting terminal 11, the surfaces of the lens-side connecting terminal 28 are also protected. That is, all surfaces of the lens-side connecting terminal 28 excluding the lens-side connecting surface 28S, are embedded in the lens-side protrusion 66 or arranged in the lens unit 40. Therefore, almost all of the lens-side non-connected area, that is a part of the surface of the lens-side connecting terminal 28 and is not connectable to the camera-side connecting terminal 11, is covered. Further, attachment of foreign matter to the lens-side connecting surface 28S can be easily prevented, because the lens-side connecting terminal 28 is arranged on the inside wall of the first lens-side recess 67.

Figure 8:
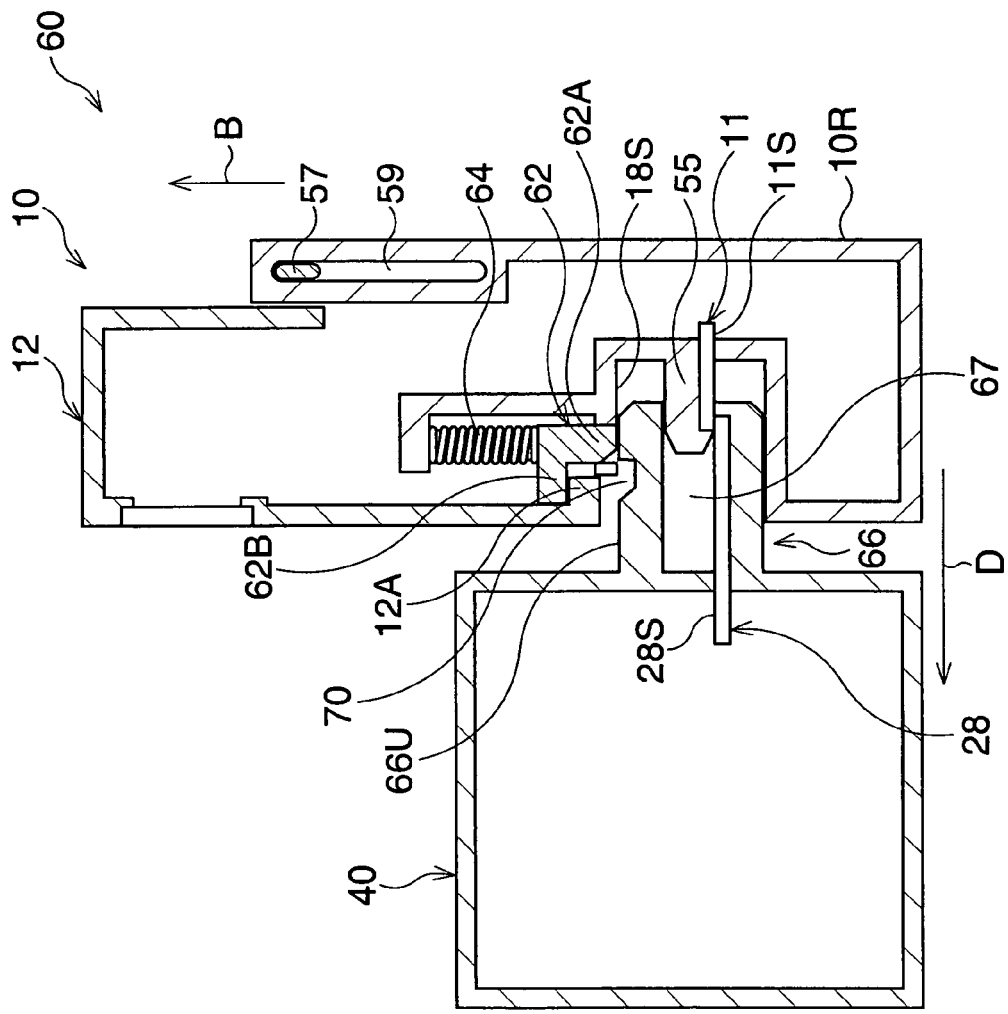
FIG. 8 is a side sectional view of the digital camera, where the lens unit has been detached from the digital camera body.

FIG. 8 is a side sectional view of the digital camera 60, where the lens unit 40 is detaching from the digital camera body 10.

When the lens unit 40 is being detached from the digital camera body 10, first, the sliding member 12 is moved upward again as indicated by the arrow B. In the pressing member 62, an engaging member 62B is provided near the coil spring 64, and the engaging member 62B is engaged with a bottom part 12A of the sliding member 12 by the operation of the sliding member 12 being moved upward. Therefore, the fitting part 62A is also moved upward. That is, in the situation where the lens unit is attached as shown in FIG. 7, moving the sliding member 12 upward makes the pressing member 62 move upward against the elasticity of the coil spring 64, and makes the fitting part 62A move to a position inside the inside wall 18S of the lens unit attaching mouth 18 (see FIG. 8). During this detaching operation, the sliding member 12 is temporarily moved to a position that is slightly higher than the upper position for pulling up the pressing member 62 to be on the upper surface 66U of the lens-side protrusion 66. As a result of this, the pressing member 62 departs from the second lens-side recess 70, so that the digital camera body 10 and the lens unit 40 cease to be attached. As mentioned above, the pressing member 62 and the coil spring 64 function as a part of a locking mechanism that locks and releases the lens unit 40 on and from the digital camera body 10.

Thus, because the attachment between the digital camera body 10 and the lens unit 40 ceases, the lens unit 40 becomes movable in the direction indicated by the arrow D, and the lens unit 40 can be detached from the digital camera body 10. In this embodiment, the lens unit 40 can be detached by only the operation of the sliding member 12, and therefore, operability for the lens unit 40 is improved. Further, a specific member exclusively for detaching the lens unit 40 is unnecessary, so that reducing the size of the digital camera body 10 and the lens unit 40 and cost reduction are possible.

In the embodiment mentioned above, the digital camera 60 comprised of the digital camera body 10 and the lens unit 40 which are connected to each other via the camera-side connecting terminal 11 and lens-side connecting terminal 28 only, can be small. Further, the digital camera 60 without a lens mount has superior anti-dust property, the camera-side connecting terminal 11 and lens-side connecting terminal 28 can be well protected. And in this camera system, a plurality of lens units including the lens unit 40 can be used with the digital camera body 10, so that a suitable photographing lens can be easily selected in accordance with the subjects to be photographed.

Further, vignetting and the red-eye phenomenon when photographing subjects can be prevented, because the lighting device 22 arranged in the upper side of the sliding member 12 is away from the optical axis of the photographing lenses in the lens unit 40, when the lens unit 40 is attached and the lighting device 22 emits illuminating light.

The digital camera 60 can be used for generating not only still pictures, but also moving pictures. And the camera system can be applied not only to the digital camera 60 shown in the embodiment, but also to video cameras, cellular phones, and so on.

The sliding direction of the sliding member 12 is not limited to the up and down direction of the embodiment. For example, the sliding member 12 may slide in the left and right direction. Further, instead of the sliding member 12 which slides along the surface of the digital camera body 10, a door member which is capable of being opened and closed, can be provided.

The photographing lenses included in the lens unit 40, is not limited to zoom lenses, and a single focus lens can be included instead of it.

Finally, it will be understood by those skilled in the art that the foregoing description is of a preferred embodiment of the apparatus, and that various changes and modifications may be made to the present invention without departing from the spirit and scope thereof.

The present disclosure relates to subject matters contained in Japanese Patent Application No. 2004-309300 (filed on Oct. 25, 2004) which is expressly incorporated herein, by reference, in its entirety.

The invention claimed is:

1. A camera body to which a lens unit having a lens-side connecting terminal is detachably attached, said camera body comprising:
    a camera-side connecting terminal which is electrically connectable to said lens-side connecting terminal; and
    a movable member which is movable between a first position that is close to said camera-side connecting terminal and a second position that is far from said camera-side connecting terminal;
    wherein said camera-side connecting terminal in said camera body is closed when said movable member is in said first position, and said lens unit is attachable when said movable member is in said second position,
    wherein a camera-side recess is provided, and said camera-side connecting terminal is arranged in said camera-side recess, and
    wherein said camera body has a camera-side protrusion in said camera-side recess, and said camera-side connecting terminal is arranged on said camera-side protrusion.

2. The camera body according to claim 1, wherein said camera-side recess is covered by said movable member when said movable member is in said first position, so that said camera-side connecting terminal in said camera body is closed.

3. The camera body according to claim 1, further comprising:
    a pressing member configured to fix said lens unit by pressing said lens unit, when said lens unit is attached to said camera body.

4. The camera body according to claim 3, wherein said pressing member is attached to an elastic member, and said pressing member presses against said lens unit due to the elasticity of said elastic member.

5. The camera body according to claim 4, wherein said pressing member engages said movable member by an operation of said movable member, so that said lens unit can be detached.

6. A camera body to which a lens unit having a lens-side connecting terminal is detachably attached, said camera body comprising:
    a camera-side connecting terminal which is electrically connectable to said lens-side connecting terminal; and
    a movable member which is movable between a first position that is close to said camera-side connecting terminal and a second position that is far from said camera-side connecting terminal,
    wherein said camera-side connecting terminal in said camera body is closed when said movable member is in said first position, and said lens unit is attachable when said movable member is in said second position, and
    wherein said movable member comprises a lighting device.

7. The camera body according to claim 1, wherein a camera-side non-connected area, that is a part of the surface of said camera-side connecting terminal and is not connectable to said lens-side connecting terminal, is at least partially covered, when said movable member is in said second position and said lens unit is not attached.

8. The camera body according to claim 7, wherein all of said camera-side non-connected area is covered.

9. A camera body to which a lens unit having a lens-side connecting terminal is detachably attached, said camera body comprising:
    a camera-side connecting terminal which is electrically connectable to said lens-side connecting terminal;
    a movable member which is movable between a first position that is close to said camera-side connecting terminal and a second position that is far from said camera-side connecting terminal;
    a camera-side lens;
    a camera-side imaging device which receives light transmitted through said camera-side lens;
    an attachment judge that judges whether or not said lens unit is attached to said camera body or not; and
    a controller, responsive to said attachment judge, configured to use said lens unit for imaging when said attachment judge judges that said lens unit is attached, and to use said camera-side lens and said camera-side imaging device when said attachment judge judges that said lens unit is not attached,
    wherein said camera-side connecting terminal in said camera body is closed when said movable member is in said first position, and said lens unit is attachable when said movable member is in said second position.

10. The camera body according to claim 1, wherein said movable member is a sliding member.

11. A camera body to which a lens unit having a lens-side connecting terminal is detachably attached, said camera body comprising:
    a camera-side connecting terminal which is electrically connectable to said lens-side connecting terminal;
    a movable member which is movable between a first position that is close to said camera-side connecting terminal and a second position that is far from said camera-side connecting terminal; and
    a locking mechanism configured to lock said lens unit on said camera body and to release said lens unit from said camera body,
    wherein said camera-side connecting terminal in said camera body is closed when said movable member is in said first position, and said lens unit is attachable when said movable member is in said second position, and
    wherein said movable member can be further moved to a third position that is farther from said camera-side connecting terminal than said second position, and said locking mechanism locks said lens unit on said camera body when said movable member is in said second position, and that releases said lens unit from said camera body when said movable member is in said third position.

12. A lens unit which is detachably attached to a camera body having a camera-side connecting terminal, the lens unit comprising:
    a photographing lens;
    an imaging device which receives light transmitted through said photographing lens; and a lens-side connecting terminal which is electrically connectable to said camera-side connecting terminal, wherein a lens-side non-connected area, that is a part of a surface of said lens-side connecting terminal and is not connectable to said camera-side connecting terminal, is at least partially covered, wherein said lens unit includes a lens-side protrusion, extending in the direction of insertion of said lens unit into said camera body, on the surface of said lens unit, and said lens-side connecting terminal is arranged on said lens-side protrusion, wherein a lens-side recess is provided in said lens-side protrusion, and said lens-side connecting terminal is arranged on an inside wall of said lens-side recess, and wherein said lens unit further comprises a lock provided on an outer surface of said lens-side protrusion configured to lock said lens unit to and release said lens unit from the camera body.

13. The lens unit according to claim 12, wherein all of said lens-side non-connected area is covered.

14. The lens unit according to claim 12, wherein the lock comprises a second lens-side recess and is provided on an upper surface of said lens-side protrusion.

* * * * *